Jan. 4, 1949.  J. P. JONES  2,457,822
MILK CONTAINER
Filed April 26, 1944
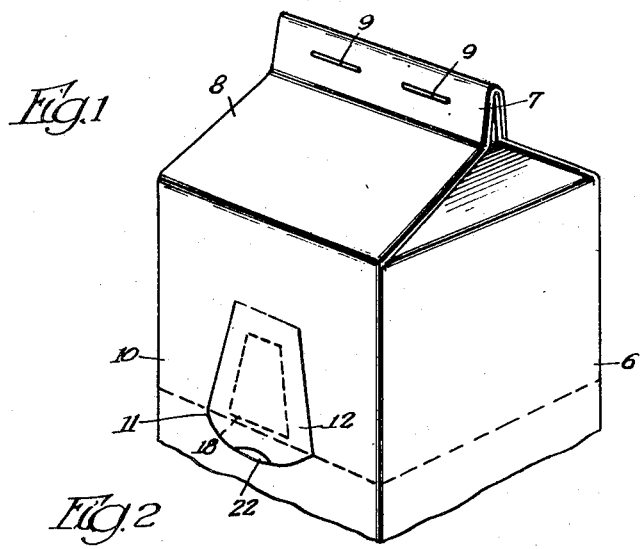
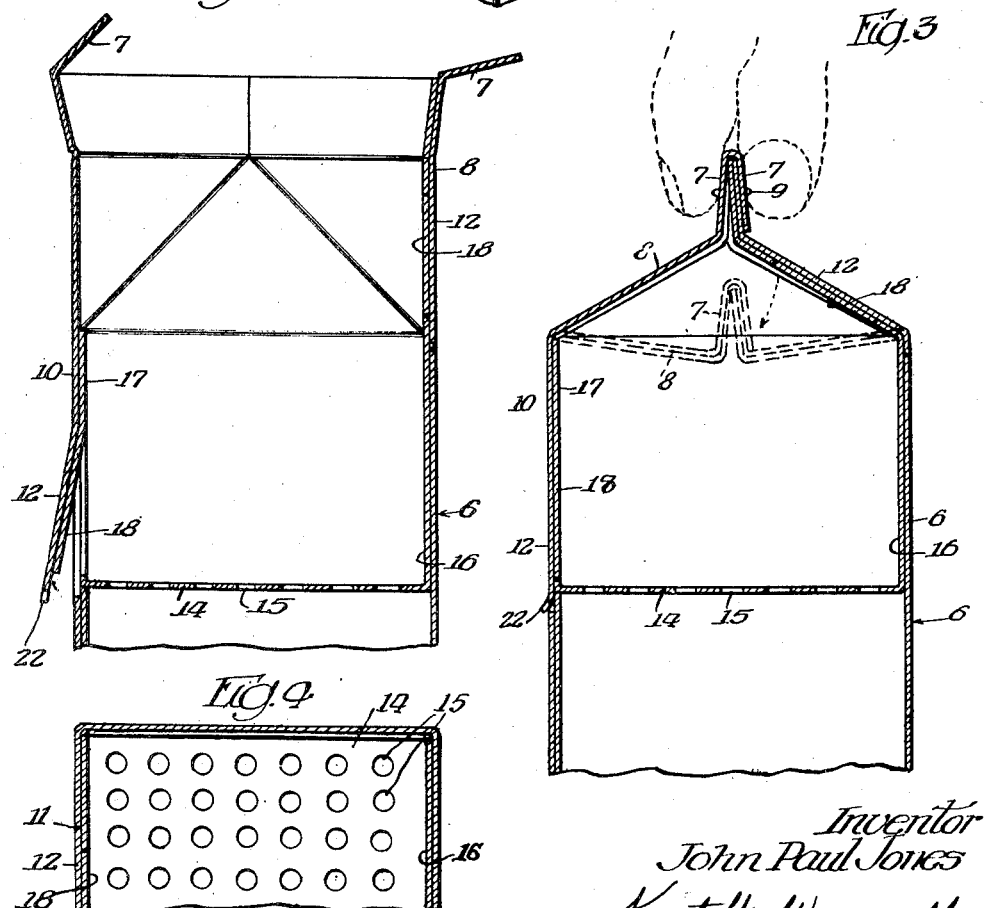
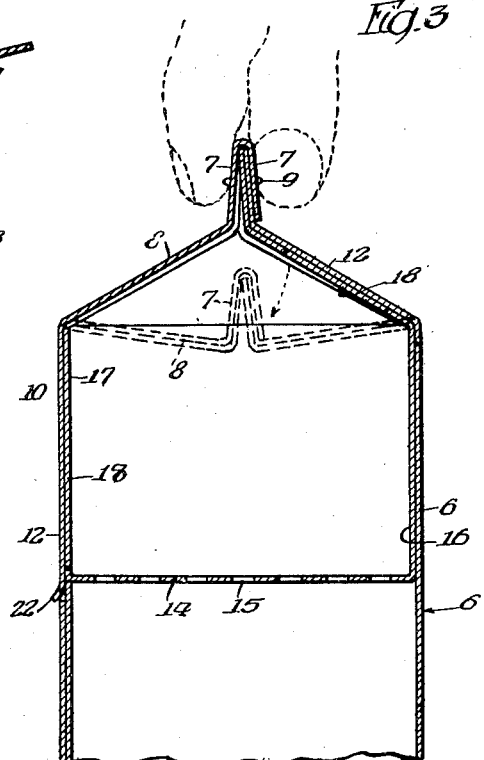
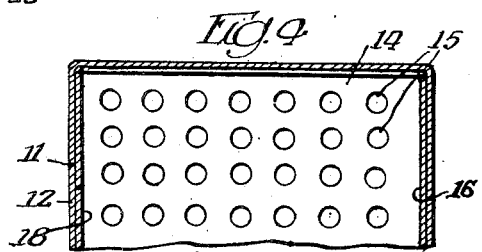
Inventor
John Paul Jones
By Kent W. Wonnell
Atty.

Patented Jan. 4, 1949

2,457,822

UNITED STATES PATENT OFFICE 2,457,822

MILK CONTAINER

John Paul Jones, Omaha, Nebr., assignor to Dairy Specialties, Inc., Omaha, Nebr., a corporation of Nebraska Application April 26, 1944, Serial No. 532,774

4 Claims. (Cl. 229—7)

This invention relates in general to a paper milk bottle, and is more particularly described as a cream separating container of this class.

An important object of the invention is to provide a milk container having means for separating and pouring out the cream which naturally arises to the top of the milk.

A further object of the invention is to provide a cream separating milk bottle in which the contents once separated into milk and cream are not easily mixed or intermingled except by violent agitation, overturning, or upsetting the bottle.

A still further object of the invention is to provide a cream separating milk bottle with a separating partition which does not interfere with the pouring of the milk from the container after the cream is removed either through the cream removing outlet or through a separate outlet at the top of the bottle.

A further object of the invention is to provide a new and improved method of causing the cream to be discharged from the top of a milk container.

Other objects of the invention will appear in the specification and will be apparent in the accompanying drawings, in which Fig. 1 is a perspective of the upper end of a milk container with a cream pouring partition and opening in accordance with this invention;

Fig. 2 is a sectional view showing the cream separation partition positioned in the container;

Fig. 3 is a sectional view also showing the top of the container depressed in broken outline; and Fig. 4 is a partial sectional plan view.

Although various means have been provided in milk bottles for drawing cream from the top of the milk by means of separate apertures, insertable taps, and the like, provision is not made for preventing intermingling of the mixture of the milk and cream when the bottle or container is handled, tipped or upset.

The present invention provides a perforated partition at the lower cream level which does not interfere with the natural rising and collection of the cream at the top of the milk, nor does it interfere with the pouring of the milk after the cream is removed. Depressing of the top will assist the cream dispensing or removal. Ordinary handling of a filled container does not easily cause a mixture of the milk and cream, and even if the container is temporarily tipped or overturned, the retarding effect of the partition will prevent the intermingling and mixture of the milk and cream to a large extent.

Referring now more particularly to the drawings, an outer milk bottle or container 6 is preferably made of waxed paper, or similar material, closed at the bottom and open at the top with opposite projecting flaps 7 to assist in closing it. The container is preferably square or rectangular in shape so that the opposite sides 8 may be pressed inwardly and the flaps folded over together and sealed in closed position by staples 9.

In one of the top sides 8 and in the opposite container side 10 is a weakened or partially severed line 11 also sealed by the covering wax to form a tongue 12 hinged about its attached end to provide an opening means when the tongue is raised.

A milk separating partition comprises an intermediate portion 14 adapted to fit transversely in the container substantially at the cream line, and having a plurality of openings 15 therethrough so that milk and cream will pass through the openings, but will restrict the passage of either liquid, tending to keep the cream separate from the milk. One end 16 of the partition member extends along one side of the container, to cover the top pouring opening, and the other extremity 17 of the member extends over the opposite side of the container to cover the cream pouring opening. In each of these portions 16 and 17, is a cut out or weakened tongue 18 directly in contact and somewhat smaller than the corresponding tongue 12 of the top and side pouring apertures. The corresponding tongues 12 and 18 may be adhesively attached so that when the outer tongue is opened, the inner tongue 18 is also opened to provide a clear pouring opening.

In making and assembling this container, the top is left open as shown in Fig. 2; the partition member is inserted with one end 16 over the upper pouring aperture, and the other end 17 over the cream pouring aperture. If desired, the partition member may be secured in place by staples extending through the upper ends of the extremities 16 and 17 to hold it accurately in place, but preferably the partition member is adhesively secured in place by a coating of wax or other adhesive so that it will be retained firmly in position without staples or similar fastening devices.

Since the inner tongues 18 are adhesively secured to the outer tongues, along their contact surfaces 21, the opening of the outer tongue will correspondingly open the inner tongue. To assist in opening the outer tongue, a small depression or notch 22 is commonly provided at the free end of the tongue into which a finger nail or a sharp implement may be inserted for dislodging and opening the outer tongue 12.

With this construction, the container is filled with milk and is set away in upright position. The cream collects at the top and rises slowly through the openings 15 in the partition, filling the space in the container on top of the partition. Any ordinary movement in shifting the container from one place to another will not dislodge the cream nor mix it with the milk. Even if the container is tilted or upset and quickly righted, but is not violently shaken, the cream will maintain its separated position due to the restriction of the partition.

In order to assist in dislodging the cream, the top is pressed downwardly, when the cream dispensing aperture is open, and may be repeatedly pressed downward as indicated in Fig. 3 with a pumping action and the result is to assist in pressing and expelling all of the cream above the partition 15 from the cream opening.

After the cream is poured off or expelled, the milk may also be poured from the cream opening, or if desired, the pouring opening may be provided at the top through which both the milk and the cream may be poured. In practice, milk bottles may be provided with the cream pouring opening only, or with both openings, depending upon the way in which they are used, and being located on opposite sides will assist in using either one separately.

I claim:

1. In a cream separating milk container, a receptacle having a wall opening extending upwardly from the cream level with a partially severed closure tongue, a cream separating partition secured within the container at the lower cream level and having upward wall attached extremities, one of which seals the opening in the wall of the container and provided with a frangible closure tongue secured to and opened by the corresponding tongue of the container.

2. In a cream separating milk container, a receptacle, a partition member inserted therein adjacent the top of the receptacle, having an intermediate perforated portion with many openings therethrough located at the cream level, extermities extending upwardly therefrom and secured to opposite walls of the container, and connected frangible tongues one in the outer container wall and one in the adjacent partition extremity just above the partition to discharge all the cream therefrom by gravity when the tongues are broken and opened outwardly.

3. In a cream separating milk container, having a partially severed hinged tongue extending upwardly from the bottom cream level therein, a partition member having an intermediate portion with a plurality of perforations to retard the flow of liquid therein and extremities extending upwardly therefrom, the perforated portion being located at the bottom cream level, and the extremities secured to opposite walls of the container, one of the extremities extending over the partially severed opening in the wall of the container and having a partially severed hinged tongue extending upwardly from the partition and secured to the coresponding tongue of the container and adapted to be opened and closed thereby.

4. A cream separating milk container having an ordinary open top receptacle with an outer wall opening normally closed by a partially severed hinged tongue extending upwardly from the lower cream level, a partition member within the container having a multiple perforated flow retarding intermediate section located at the lower cream line and having upward end extensions secured to the opposite inside walls of the container, one of the extensions closing the outer wall opening of the container from the inside, and said extension having a partially severed hinged tongue extending upwardly from the partition, the tongue of the partition member being secured to the inside of the container.

JOHN PAUL JONES.

REFERENCES CITED

The following references are of record in the file of this patent:

UNITED STATES PATENTS

| Number | Name | Date |
| --- | --- | --- |
| 1,820,549 | Williams | Aug. 25, 1931 |
| 1,960,535 | Grassmueck | May 29, 1934 |
| 2,019,242 | Aument | Oct. 29, 1935 |
| 2,077,341 | Martin et al | Apr. 13, 1937 |
| 2,263,957 | Sooy | Nov. 25, 1941 |
| 2,311,333 | French | Feb. 16, 1943 |
| 2,324,670 | Bergen | July 20, 1943 |
| 2,352,424 | Derieg | June 27, 1944 |

FOREIGN PATENTS

| Number | Country | Date |
| --- | --- | --- |
| 462,160 | Great Britain | Mar. 3, 1937 |